(12) United States Patent
Sylvain et al.

(10) Patent No.: US 7,639,698 B1
(45) Date of Patent: Dec. 29, 2009

(54) TRUSTED MULTIMEDIA COMMUNICATIONS

(75) Inventors: Dany Sylvain, Gatineau (CA); Richard C. Taylor, Manotick (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 536 days.

(21) Appl. No.: 11/365,024

(22) Filed: Mar. 1, 2006

(51) Int. Cl.
*H04L 12/56* (2006.01)
*H04J 1/16* (2006.01)

(52) U.S. Cl. .................. 370/401; 370/230; 370/389

(58) Field of Classification Search .......... 370/254, 370/230, 389, 401
See application file for complete search history.

(56) References Cited

U.S. PATENT DOCUMENTS 7,477,629 B2 * 1/2009 Tsirtsis et al. ............. 370/338
2002/0061014 A1 * 5/2002 Saller ....................... 370/352
2002/0062379 A1 * 5/2002 Widegren et al. .......... 709/227
2002/0176404 A1 * 11/2002 Girard ...................... 370/352

* cited by examiner

*Primary Examiner*—John Pezzlo
(74) *Attorney, Agent, or Firm*—Withrow & Terranova, P.L.L.C.

(57) ABSTRACT

A transit domain is a domain in which trusted communications are generally required, and a foreign domain is one in which any number entities are associated. The users within a foreign domain will have a trusted relationship with their foreign domain. In turn, the foreign domain will establish a trusted relationship with the transit domain. The users in the foreign domains need not have a direct relationship with the transit domains. The foreign domains are connected by the transit domains, and session messages used to establish and control communication sessions between entities must pass through the transit domains to travel from one foreign domain to another. These session messages intended for or originating from a foreign domain are processed by edge control nodes in the transit domain, based on a service policy, which has been established for the foreign domain associated with the session message.

27 Claims, 11 Drawing Sheets

TRUSTED MULTIMEDIA COMMUNICATIONS

FIELD OF THE INVENTION

The present invention relates to telecommunications, and in particular to providing more controlled and secure telecommunications over packet-based networks, such as the Internet.

BACKGROUND OF THE INVENTION

Prior to the Internet, virtually all telephony calls were provided over the public switched telephone network (PSTN). The PSTN is a protected network where only authorized users have access. Further, the PSTN has mechanisms in place to ensure authorized users can take advantage of only those services for which they are authorized. As such, the PSTN provides significant control over who can make calls and how those calls are controlled.

As packet networks such as the Internet evolved, the ability to support packet-based telephony calls became a reality. The flexibility provided by packet networks has allowed disparate multimedia services to be associated for a much richer communication experience. The advent of gateways has allowed the packet networks and PSTN to cooperate with one another, such that a given telephony call can be supported over the Internet and the PSTN.

Unlike the PSTN, packet networks generally have an open architecture where virtually anyone can gain access and communicate as desired. Such openness has its benefits, but there are also numerous drawbacks. These drawbacks include the inability to control spammers and unscrupulous callers and vulnerability to security threats. As interworking between the PSTN, and the packet networks continues, these drawbacks are going to extend to the PSTN because the packet networks are going to provide unsecured access to the PSTN for various calls and multimedia sessions.

Accordingly, there is a need to provide more controlled and secure multimedia sessions, including telephony calls, over packet networks. There is a further need to ensure that the control and security limitations of existing packet-based sessions do not extend to the PSTN as interworking between the packet networks and PSTN evolves.

SUMMARY OF THE INVENTION

The present invention provides a communication environment, which is sub-divided into transit domains and foreign domains. A transit domain is a domain in which trusted communications are generally required, and a foreign domain is one in which any number of entities are associated. The users within a foreign domain will have a trusted relationship with their foreign domain. In turn, the foreign domain will establish a trusted relationship with a transit domain. The users in the foreign domains need not have a direct relationship with the transit domains. The foreign domains are connected by the transit domains, and session messages used to establish and control communication sessions between entities must pass through the transit domains to travel from one foreign domain to another. These session messages intended for, or originating from, a foreign domain are processed by edge control nodes in the transit domain based on a service policy, which has been established for the foreign domain associated with the session message.

The service policies may be applicable to all entities in a foreign domain; however, specific users may have further defined policies. The service policies may be based on: the type of communication session requested, time, date, destination party, source party, destination domain, source domain, prior related communication sessions, and direction of flow (inbound or outbound). The policies may result in forwarding the session message without modification, blocking the session message, rerouting the session message or the session involved, or modifying the session message. The modifications may be used to restrict or change the session or services associated with the session message. Different foreign domains may have different service policies.

In certain scenarios, the foreign domain will not have a trusted relationship with a transit domain. The edge control node in the transit domain may have further policies to handle session messages intended for or received from a foreign domain, which is not associated with the transit network. The policies may provide the same range of processing as described above, but will generally be more restrictive. For example, a policy for a foreign domain may restrict all communication sessions to voice or instant messaging session, block all session messages, or allow certain sessions that were initiated from a foreign domain with which the transit domain has a trusted relationship. The Internet is an example of a foreign domain where a trusted relationship with a transit domain typically does not exist.

In addition to applying policies for a given foreign domain to session messages, the edge control nodes may provide additional functions. In particular, the edge control nodes may provide protocol adaptation between foreign and transit domains where the affected foreign and transit domains use different protocols or protocol versions. The edge control nodes may also assist with network address translation and firewall traversal. Acting as a liaison between the foreign and transit domains increases the range of features supported over what may otherwise be at least partially incompatible domains.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
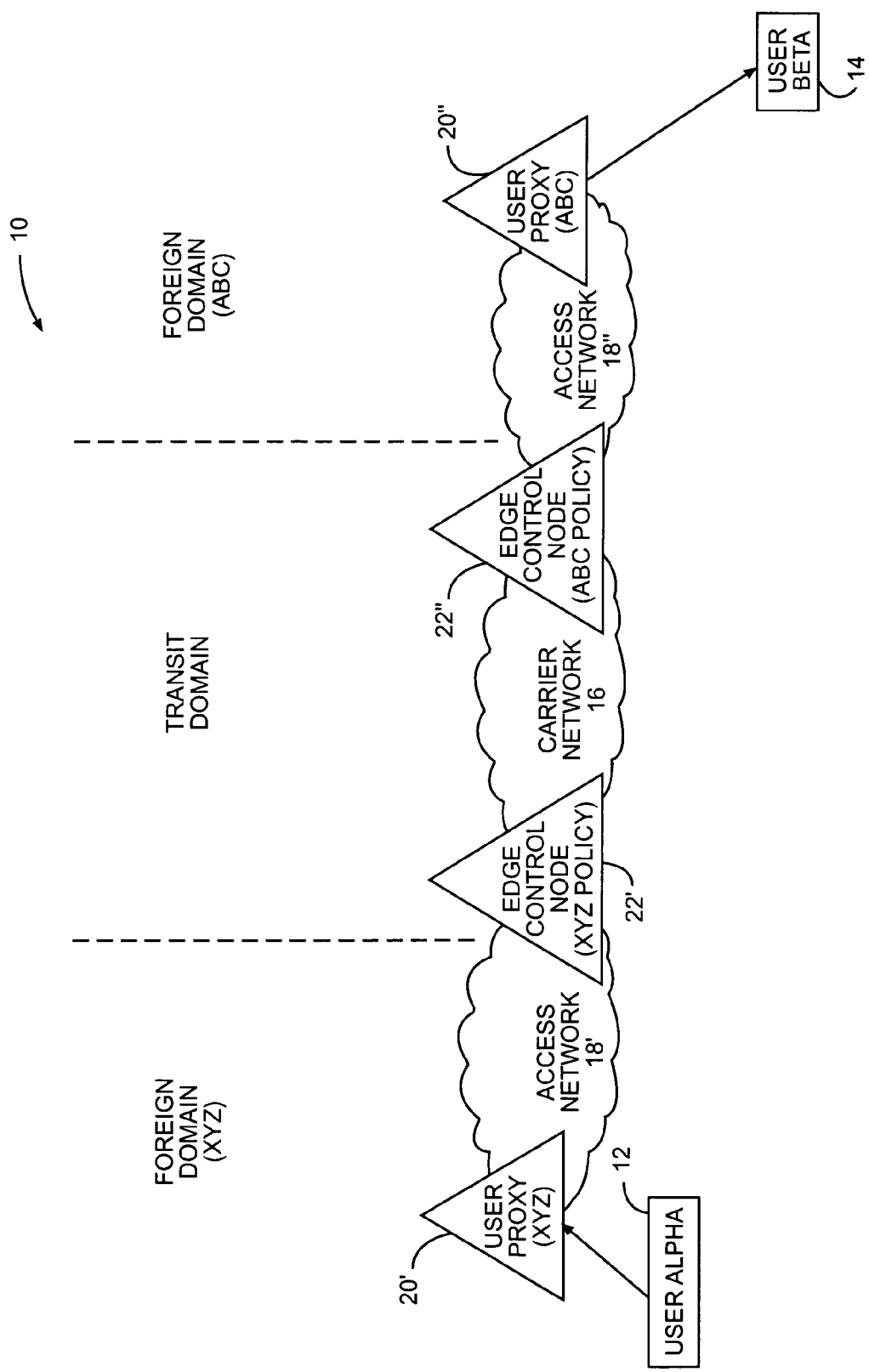
FIG. 1 illustrates a communication environment according one embodiment of the present invention.

FIG. 1 illustrates a communication environment 10 according to one embodiment of the present invention, wherein session signaling to establish and control a communication session between user alpha 12 and user beta 14 may take place over a carrier network 16 via the respective access networks 18' and 18". User alpha 12 and user beta 14 represent any type of communication terminal. The communication environment 10 is broken into three signaling domains: a transit domain and two foreign domains. A transit domain is a domain in which trusted communications are generally required and is represented by the carrier network 16. A foreign domain is one in which any number of users, such as user alpha 12 and user beta 14, are supported by one or more user proxies 20' and 20". Example foreign domains include users served by a given session initiation protocol (SIP) proxy, an Internet Protocol Multimedia Subsystem (IMS), and the Internet.

Generally, the users within a foreign domain will have a trusted relationship with the user proxies 20' or 20" that serve their domain. In turn, the user proxies 20' and 20" will establish a trusted relationship with a transit domain, and in particular, will establish a trusted relationship with corresponding edge control nodes 22' and 22" of the transit domain. The users in the foreign domains need not have a direct relationship with the transit domains.

As illustrated, user proxy 20' supports a foreign domain xyz, which includes user alpha 12 among any number of other users (not shown). User alpha 12 has a trusted relationship with user proxy 20', but does not have trusted relationship with the transit domain of carrier network 16. User proxy 20' will have a trusted relationship with edge control node 22' and perhaps edge control node 22". Similarly, user proxy 20" supports a foreign domain abc, which includes user beta 14 among any number of other users. User beta 14 has a trusted relationship with user proxy 20", but does not have a trusted relationship with the transit domain of the carrier network 16. User proxy 20" will have a trusted relationship with edge control node 22" and perhaps edge control node 22'.

The foreign domains are connected by transit domains, and session messages used to establish and control communication sessions between users must pass through the transit domains to travel from one foreign domain to another. These session messages that are intended for or originating from a foreign domain are processed by the edge control nodes 22' and 22" in the transit domain, based on a service policy that has been established for the foreign domain.

The service policies may be applicable to all users in a foreign domain; however, specific users may have further defined policies. The service policies may be based on the type of communication session requested, time, date, destination party, source party, destination domain, source domain, prior related communication sessions, and direction of flow (inbound or outbound). The policies may result in forwarding the session message without modification, blocking the session message, rerouting the session message or the session involved, and modifying the session message. The modifications may be used to restrict or change the session or services associated with the session message. Different foreign domains may have different service policies.

In certain scenarios, the foreign domain will not have a trusted relationship with a transit domain. An edge control node 22' or 22" may have further policies to handle session messages intended for or received from a foreign domain, which does not have a trusted relationship with the transit network. The policies may provide the same range of processing as described above, but will generally be more restrictive. For example, a policy for a foreign domain may restrict all communication sessions to voice or instant messaging sessions, block all session messages, or allow certain sessions that were initiated from a foreign domain with which the transit network has a trusted relationship. The Internet is an example of a foreign domain where a trusted relationship with a transit domain does not exist. The flexibility in creating policies is virtually limitless.

In addition to applying policies for a given foreign domain to session messages, the edge control nodes 22' and 22" may provide additional functions. In particular, edge control nodes 22' and 22" may provide protocol adaptation between foreign and transit domains where the affected foreign and transit domains use different protocols or protocol versions. The edge control nodes 22" and 22" may also assist with network address translation and firewall traversal. Acting as a liaison between the foreign and transit domains increases the range of features supported over what may otherwise be at least partially incompatible domains.

The present invention is particularly beneficial in multi-carrier environments wherein multimedia communications are supported by multiple carriers at any given time. In essence, each carrier may be the primary interconnect point for a group of user proxies 20' or 20", wherein the carrier authenticates and authorizes approved user proxies 20' or 20". The carrier can act to ensure the traceability of calls to an originator while preserving privacy among users, as needed. Further, the carrier may control available services among the various users having access to the carrier. The carriers provide these functions, at east in part, with the edge control nodes 22' and 22".

Figure 2:
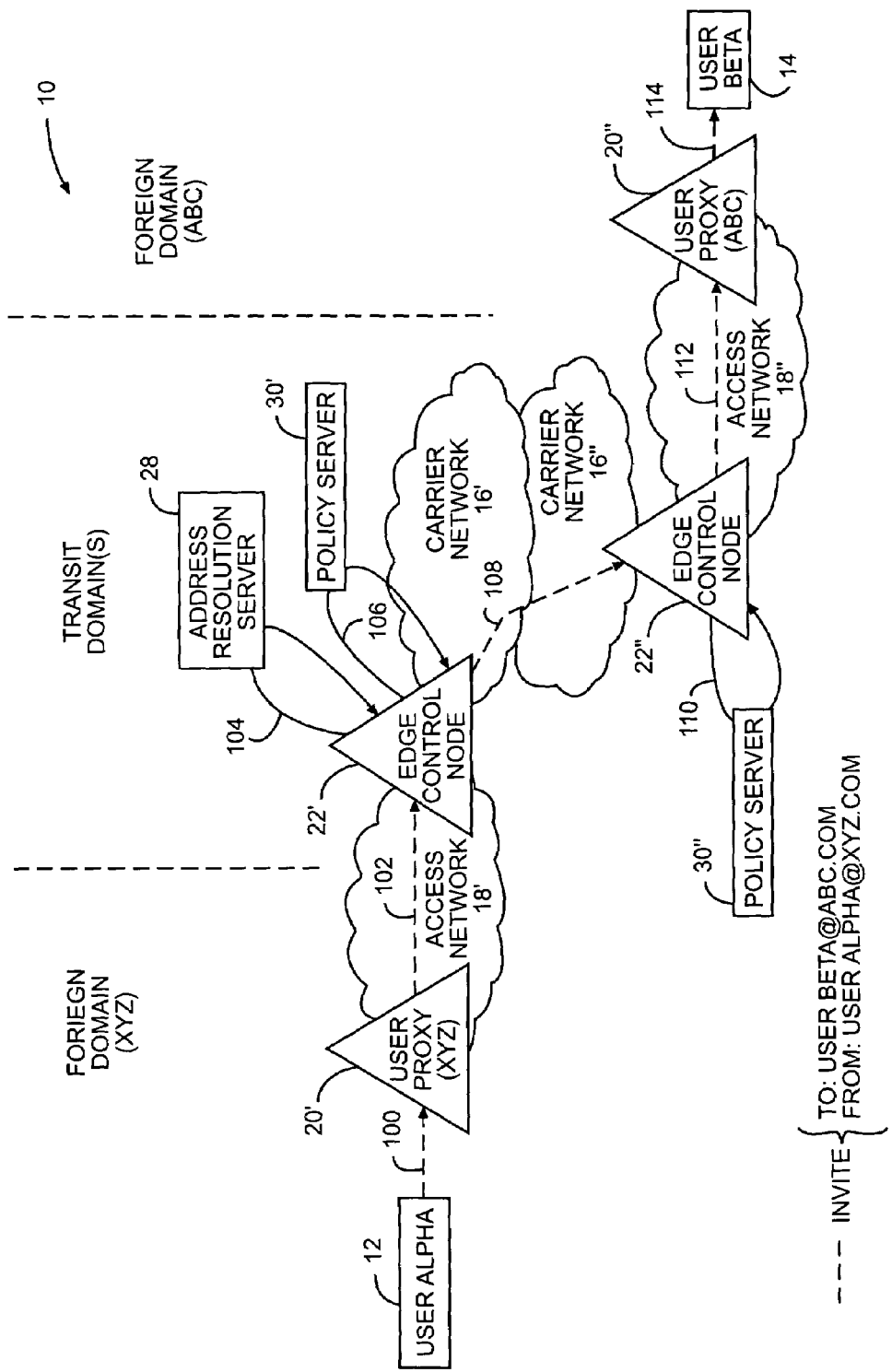
FIG. 2 illustrates establishing multimedia communications over one or more carrier networks according to one embodiment of the present invention.

With reference to FIG. 2, edge control nodes 22' and 22" act as trusted intermediaries for the transit domain supported by carrier networks 16' and 16". In foreign domain xyz, user alpha 12 is supported by user proxy (xyz) 20', which is associated with the edge control node 22' via an access network 18'. In foreign domain abc, user beta 14 is associated with user proxy (abc) 20", which is associated with the edge control node 22" via the access network 18". Edge control nodes 22' and 22" are associated with connected transit domains. Any type of multimedia communication, including data, audio, video, voice, and messaging sessions, may be established between user alpha 12 and user beta 14. User alpha 12 and user beta 14 represent enterprise, residential, PSTN, or mobile users supported by any type of underlying wired or wireless network.

As illustrated, edge control node 22' is associated with an address resolution server 28 and a policy server 30'. Edge control node 22" is associated with a policy server 30". Edge control node 22' may interact with the address resolution server 28 to locate addresses or locations to which session messages should be forwarded based on destination addresses, domains, and the like. In one embodiment, the address resolution server 28 may be or operate in a manner similar to a Domain Name Service (DNS) entity. The policy servers 30' and 30" function to provide the respective edge control nodes 22' and 22" with policies for foreign domains to filter inbound and outbound session messages. These policies may restrict or control session messages, and thus any resulting media sessions, based on service type, user, user group, source, destination, domain, and sub-domain. Prior to processing session messages, the respective edge control nodes 22' and 22" will authenticate the external user proxies 20' and 20", respectively.

Notably, each carrier network 16' may be associated with multiple edge control nodes 22', and each edge control node 22' may be associated with any number of user proxies 20'. The one-to-one match up in FIG. 2 is provided for conciseness and clarity. Once the user proxies 20' and 20" are authenticated, secure signaling connections may be established between the proxies 20' and 20" and the corresponding edge control nodes 22' and 22". Once these relationships are established, the edge control nodes 22' and 22" will be able to adapt incoming messaging to a common session control protocol or variant thereof, as well as process outgoing session control protocol messages in a complimentary fashion. For example, the edge control nodes 22' and 22" may support various SIP, H.323, and primary rate interface implementations, among associated networks. The edge control nodes 22' and 22" may control quality of service levels based on information provided by the respective policy servers 30' and 30". Since the edge control nodes 22' and 22" reside at the edges of the respective transit domains provided by the carrier networks 16' and 16", various border control functions may be provided, such as network address translation and firewall traversal. In the illustrated embodiment, the edge control nodes 22' and 22" may support IPv4 and IPv6 operation or interaction.

As an example, assume user alpha 12 desires to initiate a communication session with user beta 14. Further assume that session is initiated using a session message, such as a SIP Invite. Accordingly, user alpha 12 will send an Invite to user proxy 20' (step 100), wherein the destination of the Invite is userbeta@abc.com, and the source of the Invite is useralpha@xyz.com. The associated user proxy 20' will receive the Invite and forward the Invite to edge control node 22' (step 102) as the destination address is outside the domain of user proxy 20'. Edge control node 22' will interact with the address resolution server 28 to obtain routing information for the Invite (step 104). In this instance, the address resolution server 28 will indicate that the Invite should be forwarded to carrier network 16", which serves the foreign domain abc. Edge control node 22' will also interact with policy server 30' to obtain policy governing session messages originating from the foreign domain xyz (step 106). The policy may define whether the desired service is available, services to the desired destination are allowed, or a combination thereof.

Assuming the destination and service are approved, edge control node 22' will forward the Invite to carrier network 16", which will also interact with an address resolution server that will provide the edge control node 22" as the next hop (step 108). Edge control node 22" may access a policy for the foreign domain abc from an associated policy server 30" to determine whether the requested service is allowed, it services are approved for user beta 14, or a combination thereof. If approved, edge control node 22" will forward the Invite to user proxy 20" (step 112), which will forward the Invite to user beta 14 (step 114). At this point, the session messaging sequence may continue back and forth between user alpha 12 and user beta 14 via the respective intermediaries to establish a desired communication session. The policies as implemented by the edge control nodes 22' and 22" may be based on the sources or destinations for a given session message. In addition to filtering session messages based on message source or destination, different services may be made available to different sources or destinations. As an example, the policy may allow basic voice and data services, but limit instant messaging and prevent international calls.

Figure 3A:
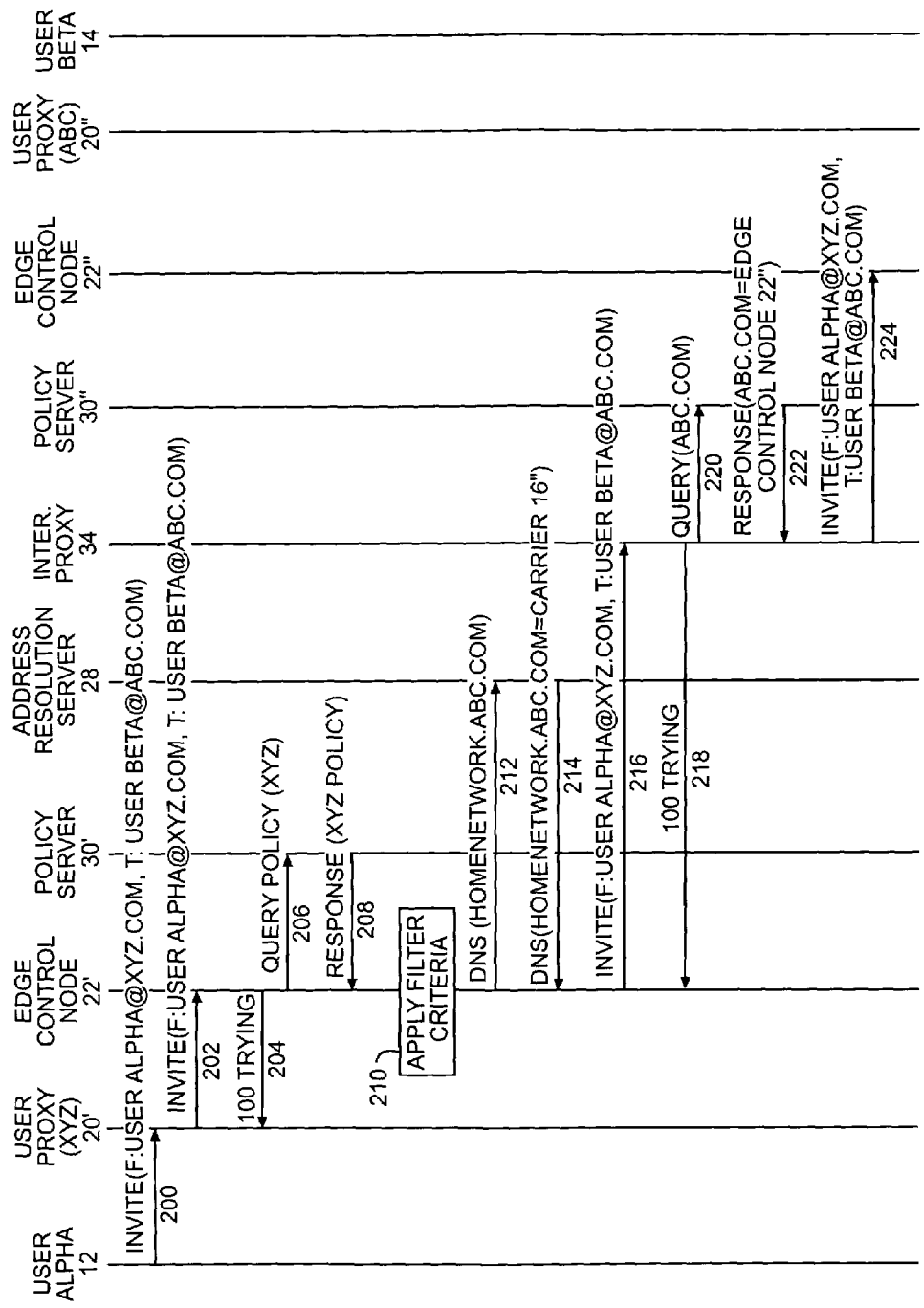
FIGS. 3A and 3B illustrate a communication flow corresponding to the example provided in FIG. 2.
Figure 3B:
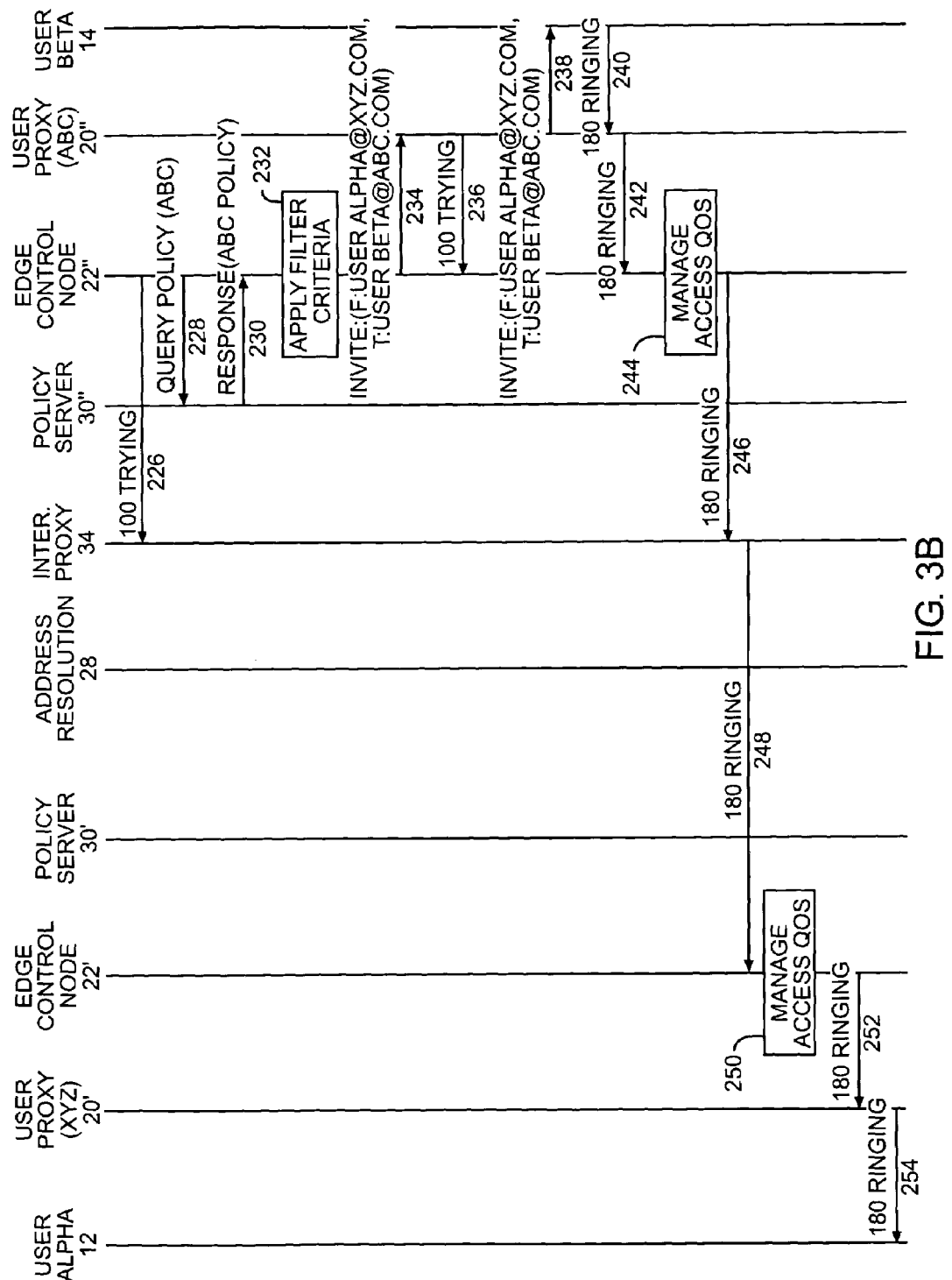

With reference to FIGS. 3A and 3B, a more detailed communication flow is provided for the example illustrated in FIG. 2. Initially, assume user alpha 12 sends an Invite to establish a communication session with user beta 14 (step 200). The Invite will be received by user proxy 20' and forwarded to the appropriate edge control node 22' (step 202). Edge control node 22' may respond to user proxy 20' with a 100 Trying message (step 204), as well as send a query for a policy for the foreign domain xyz to policy server 30' (step 206). Policy server 30' will respond to edge control node 22' by providing the policy for users in the foreign domain xyz (step 208). Edge control node 22' will analyze the policy in light of the information provided in the Invite and apply appropriate filter criteria to the Invite in light of the policy (step 210). For example, if user alpha 12, user proxy 20', or the type of service requested were not authorized in light of the policy, edge control node 22' could either reject the Invite or modify the Invite within defined parameters.

Assuming the Invite is authorized to proceed, edge control node 22' may access the address resolution server 28, such as a DNS, to identify the carrier 16" to which the Invite should be forwarded (step 212). In this example, the destination domain, foreign domain abc, is used in the query to the address resolution server 28, which will respond by identifying carrier network 16" as the one serving user beta 14 (step 214). With this information, edge control node 22' will forward the invite toward carrier network 16".

In certain embodiments, the Invite may be forwarded through an interrogating proxy 34, such as an interrogating call/session control function (I-CSCF) in an IMS network (step 216). Again, a 100 Trying message is sent back to edge control node 22' in response to the Invite (step 218). Further, the interrogating proxy 34 may send a Query to the policy server 30" to identify the edge control node (22") supporting user beta 14 or the associated user proxy 20" (step 220). Policy server 30" will respond by indicating that edge control node 22" is supporting the foreign domain abc (step 222). The interrogating proxy 34 will then forward the Invite to edge control node 22' (step 224), which will respond with a 100 Trying message (step 226).

Upon receipt of the Invite, edge control node 22' may also query the policy server 30" to obtain a policy containing filter criteria for the foreign domain abc, which is associated with user beta 14 (step 228). Policy server 30" will respond by providing the policy for users in the foreign domain abc to edge control node 22" (step 230). Notably, the example provides filtering criteria on a group basis for users in a defined domain. The policy may be further applied to sub-domains or sub-groups of users in a particular domain, groups of domains, or on a per-user basis. With the policy, edge control node 22" may apply the appropriate filter criteria to the Invite to determine if Invite should be forwarded towards its destination, modified in any way, or rejected (step 232).

Assuming the Invite should be forwarded toward its destination, edge control node 22" will send the Invite to user proxy 20" (step 234), which will respond with a 100 Trying message (step 236). User proxy 20" will then forward the Invite to user beta 14 (step 238) to initiate establishment of the communication session requested by user alpha 12. Notably, the Invite message may include Session Description Protocol (SDP) information necessary to communicate with user alpha 12. In response to receiving the Invite, user beta 14 may respond with a 180 Ringing message (step 240), which is forwarded by user proxy 20" to edge control node 22" (step 242).

Edge control node 22" may obtain quality of service information to apply to the session and then take the necessary steps to manage quality of service levels forwarded by access network 18" (step 244). Edge control node 22" will also forward the 180 Ringing message to the interrogating proxy 34 (step 246), which will forward the 180 Ringing message to edge control node 22' (step 248). Edge control node 22' will also obtain quality of service information and function to manage quality of service levels provided by the access network 18' (step 250).

The 180 Ringing message is then forwarded to user proxy 20' (step 252), which forwards the 180 Ringing message to user alpha 12. At this point, session signaling will continue back and forth between user alpha 12 and user beta 14, such that the requisite information for communicating is provided to the participating parties and the communication session will be established. Notably, the bearer path or the communication session need not flow through all of the call signaling entities that participated in session establishment.

Figure 4:
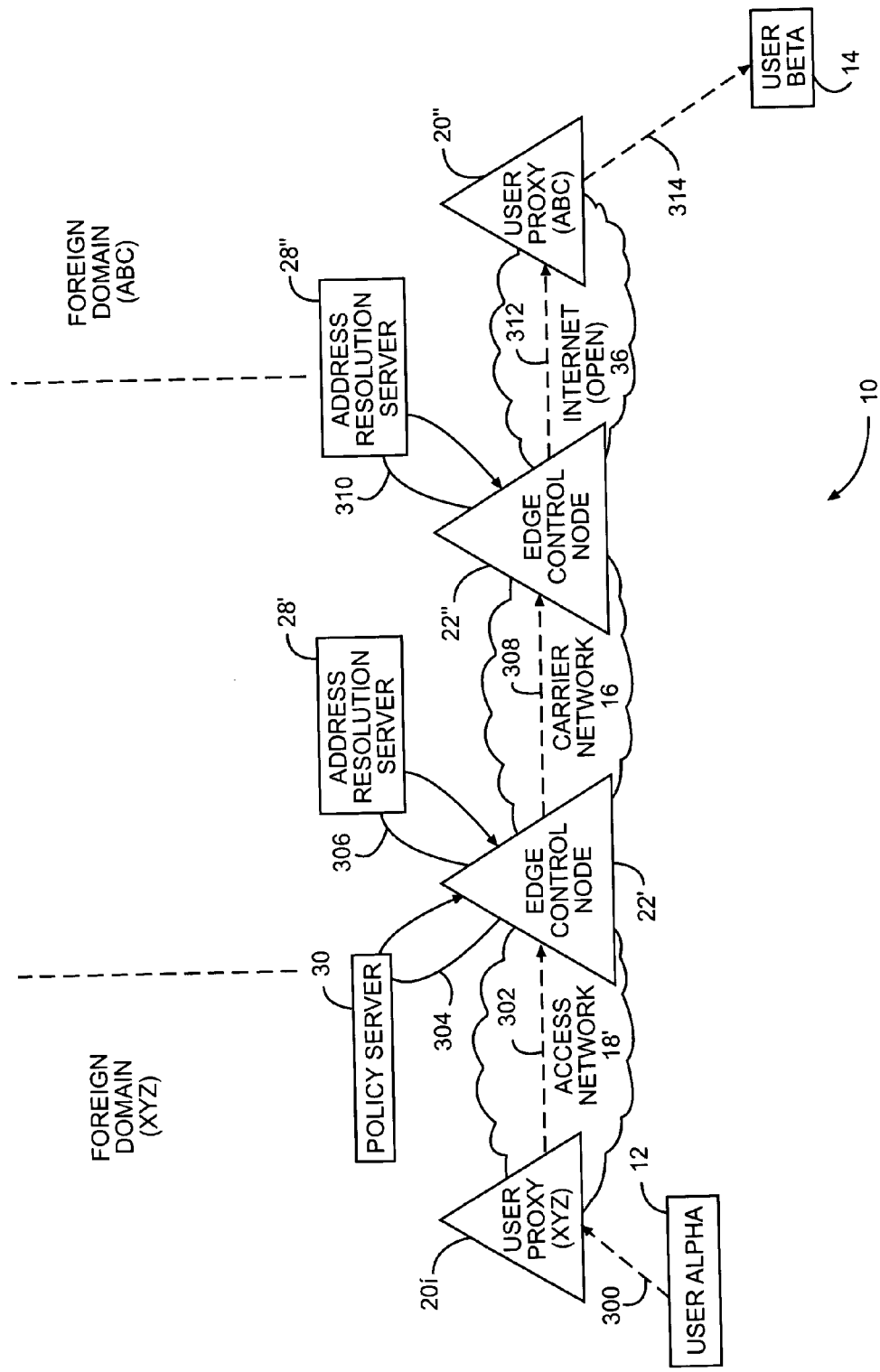
FIG. 4 illustrates establishment of an outbound communication session from the carrier network to the Internet according to one embodiment of the present invention.

Turning now to FIG. 4, another embodiment of the present invention is illustrated, wherein edge control node 22" acts as an internet edge control node at the boundary of carrier network 16 and the Internet 36, which is part of foreign domain abc. For outbound calls from the carrier network 16 to the Internet 36, edge control node 22" may provide various functions. Outbound session messages may be filtered based on the source or destination of the session message, the type of service associated with the session message, or any other appropriate criteria. For example, messages intended for certain destinations may be blocked. For those messages that are forwarded towards their destinations, edge control node 22" may query the address resolution server 28" to find an appropriate user proxy 20" supporting the destination user. Further, edge control node 22" may provide a firewall, which is opened for session messages intended for a specific destination user, and close the firewall after a predefined amount of time.

For inbound session messages received over the Internet 36, edge control node 22" will filter the session messages as desired. Edge control node 22" may allow all or certain types of session messages depending on the policies set by the carrier network 16. This internet based edge control node 22" may also operate to route inbound session messages to an appropriate carrier based edge control node 22', wherein both of the edge control nodes 22' and 22" cooperate as trusted intermediaries. For anti-spamming functions, edge control node 22" may check internal or external databases to ensure that the source IP address matches the session protocol domain of the session message, as well as function to authenticate internet users who are sending session control messages. For session messages traveling in either direction, edge control node 22" may adapt the respective session messages to comply with common protocols supported by the carrier network 16 as well as the Internet 36.

Continuing with FIG. 4, outbound processing of the session message is illustrated according to one embodiment. User alpha 12 sends an Invite toward user beta 14 to initiate a multimedia session. The Invite is directed to user proxy 20' (step 300), which will forward the Invite to the edge control node 22' (step 302). Edge control node 22' may access the policy server 30 to obtain a policy for the foreign domain xyz (step 304). Based on the policy, the Invite message is filtered as appropriate. If the Invite should be forwarded toward the intended destination, edge control node 22' may access address resolution server 28' to determine whether carrier based edge control node 22' has been registered with the destination (step 306). In this instance, there is no carrier based edge control node associated with the destination, and if the filter criteria allows, edge control node 22' will forward the Invite to the internet based edge control node 22", such that the Invite can be forwarded over the Internet 36 towards its destination (step 308). The internet based edge control node 22" may access an address resolution server 28" to identify user proxy 20', which is associated with the destination of the Invite (step 310). With this information, edge control node 22" will forward the Invite over the Internet 36 to user proxy 20" (step 312), which will send the Invite to user beta 14 as part of the session initiation sequence. In this embodiment, when endpoints are not served by a trusted intermediary, such as a carrier based edge control node 22', the session messages may be simply forwarded over the Internet 36.

Figure 5A:
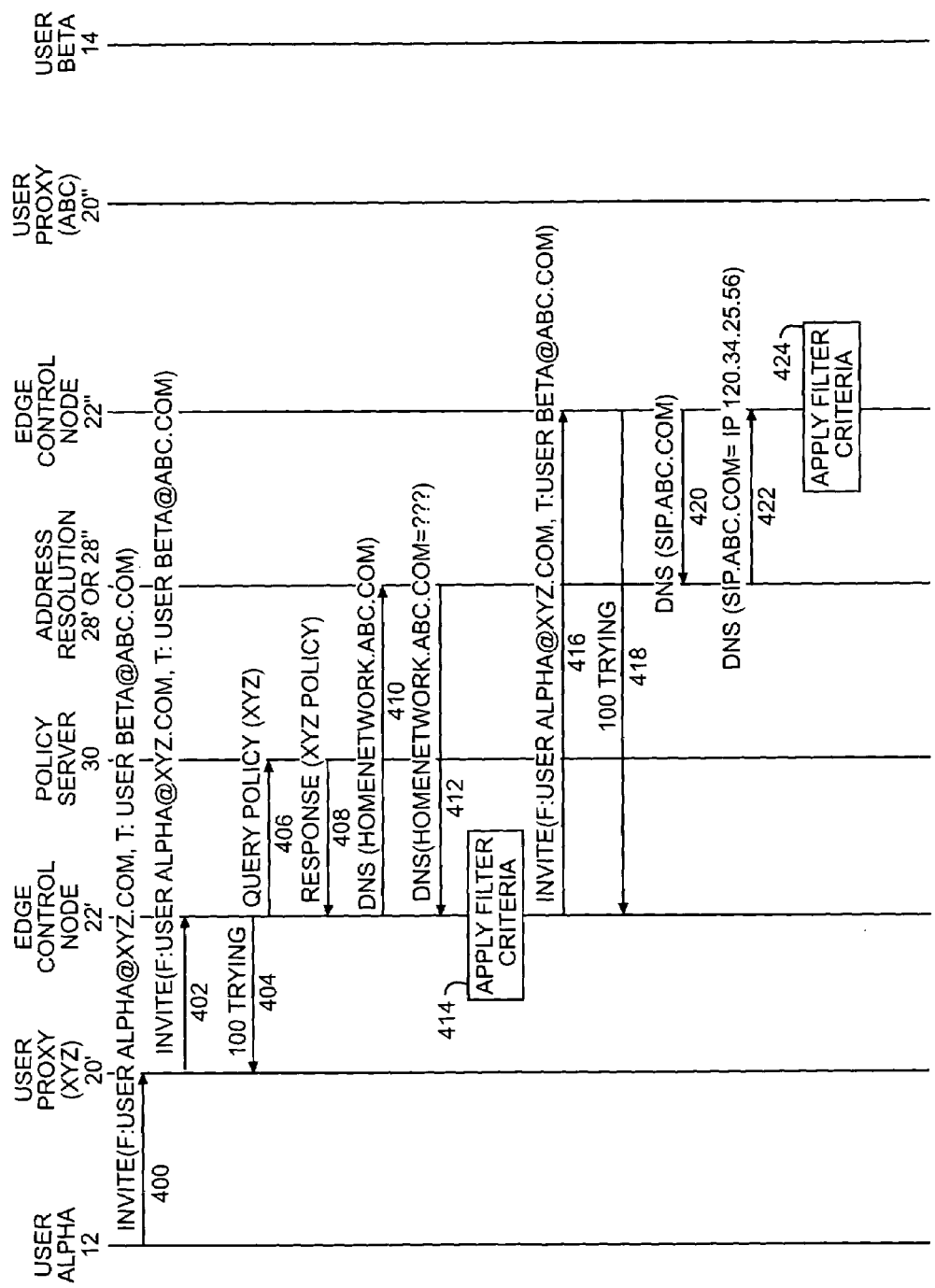
FIGS. 5A and 5B illustrate a communication flow for the example provided in FIG. 4.
Figure 5B:
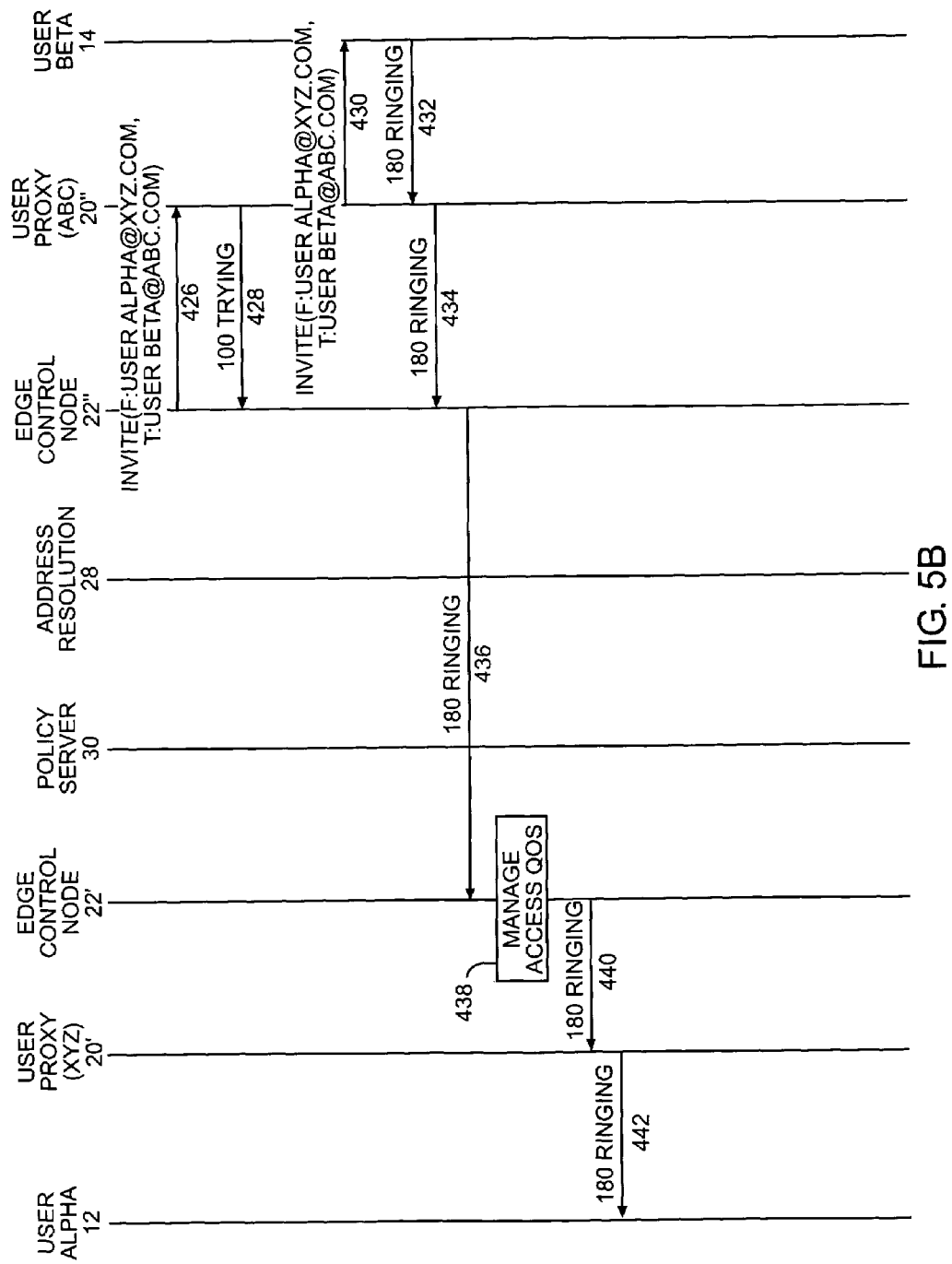

A more detailed communication flow for the example of FIG. 4 is provided in FIGS. 5A and 5B. Initially, user alpha 12 will send an Invite to user proxy 20' (step 400), which will forward the Invite to edge control node 22' (step 402). Edge control node 22' will respond with a 100 Trying message (step 404) as well as send a query to the policy server 30 to obtain the policy for the foreign domain xyz (step 406). The policy server 30 will respond with the policy for the foreign domain xyz (step 408). Meanwhile, edge control node 22' may send a request to address resolution server 28' to identify a trusted carrier based on the domain associated with the destination of the Invite (step 410). In this instance, the foreign domain abc (Internet) 36 is not registered as a trusted carrier based domain. Accordingly, address resolution server 28' will respond no entry found (step 412). Since the destination domain is not supported by a carrier based edge control node 22, the filter criteria for an unregistered domain is applied to the Invite (step 414).

Edge control node 22' will then send the Invite toward the internet based edge control node 22" (step 416), and respond to user proxy 20' with a 100 Trying message (step 418). The internet based edge control node 22" may access the address resolution server 28 (28' or 28") to identify the address of user proxy 20" (step 420). As illustrated, the IP address associated with the foreign domain abc is IP 120.34.25.56. The address resolution server 28 will use the destination domain, foreign domain abc, to identify the IP address for user proxy 20" and provide it back to edge control node 22" (step 422). Any applicable filtering criteria may be accessed and applied to the Invite (step 424). Assuming the Invite is not blocked or otherwise restricted, edge control node 22" will forward the Invite to user proxy 20" (step 426), which will respond with a 100 Trying message (step 428). User proxy 20" will then forward the message to user beta 14 (step 430).

In response to receiving the Invite, user beta 14 may respond with a 180 Ringing message including SDP information for user beta 14 (step 432). Notably, the SDP information for user alpha 12 may have been included in the Invite. User proxy 20" will receive the 180 Ringing message and send a like message to the internet based edge control node 22" (step 434), which will forward the message to the carrier based edge control node 22' (step 436). Upon receipt of the 180 Ringing message, edge control node 22' may take the necessary steps to manage quality of service levels within access network 18 (step 438), as well as forward the 180 Ringing message to user proxy 20' (step 440), which will further forward the 180 Ringing message to user alpha 12 (step 442).

The requisite signaling to establish the requested session will continue in traditional fashion until completion, wherein the communication session is established between user alpha 12 and user beta 14. In operation, the internet based edge control node 22" may keep track of or use policy server 30 to keep track of domains or users that are approved or disapproved, as well as services that are approved or disapproved in general or for specific users, groups, or domains. This information will be used to provide the filter criteria, which is applied to the Invite messages passing from the carrier network 16 to the Internet 36 via the internet based edge control node 22".

Figure 6:
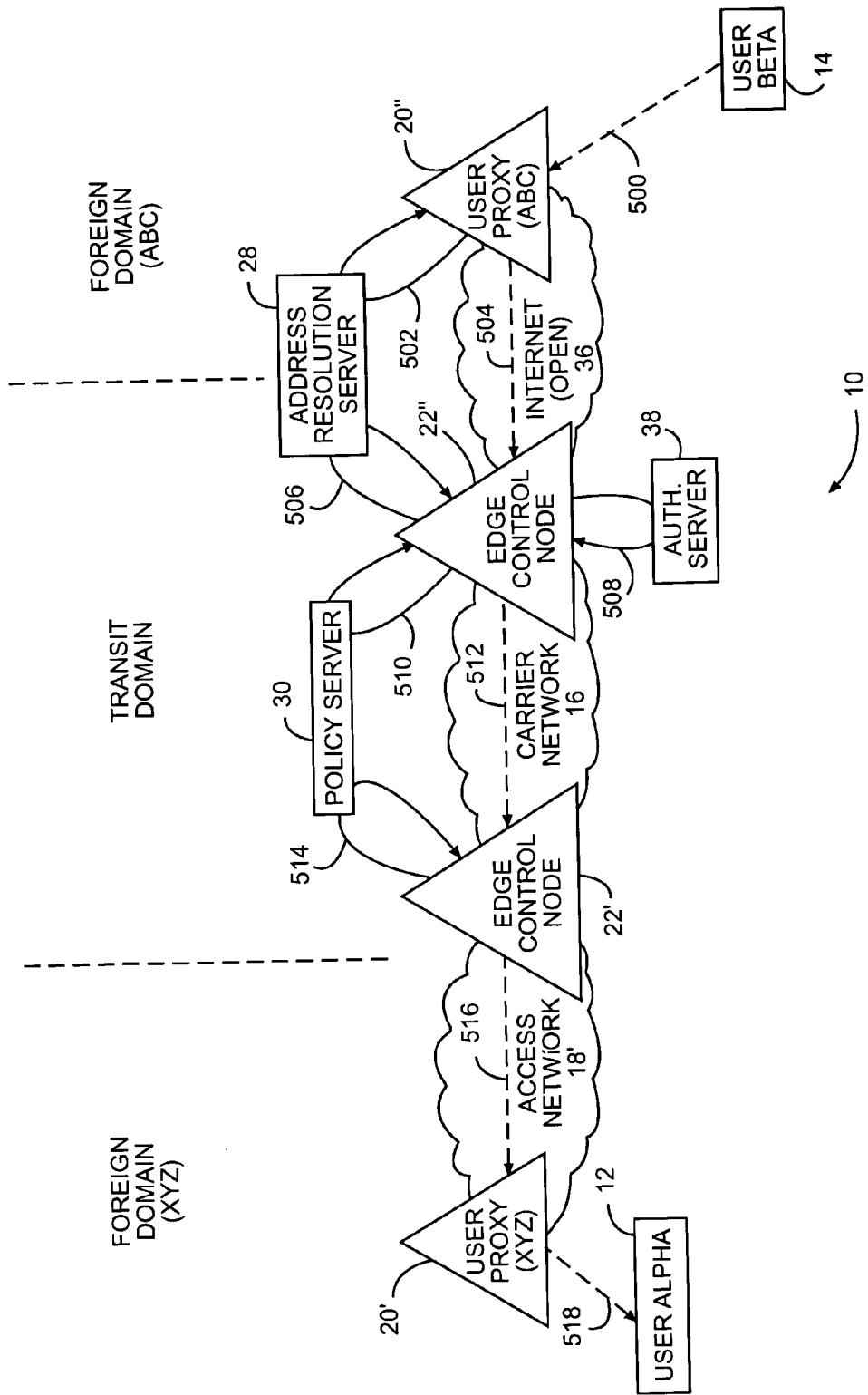
FIG. 6 illustrates establishment of an inbound communication session from the Internet via a carrier network according to one embodiment of the present invention.

Turning now to FIG. 6, an inbound session message routing scenario is illustrated. In this embodiment, the carrier based edge control node 22' and the internet based edge control node 22" may cooperate to allow the carrier network 16 to effectively control which external users can gain access to the carrier network 16 and services that are available based on predefined policies. Further, inbound session messages from the Internet 36 may be authenticated by the internet based edge control node 22" to enhance security and ensure only authorized users gain access to the carrier network 16.

Initially, assume that user beta 14 initiates an Invite message intended for user alpha 12. The Invite will be initially provided to user proxy 20" (step 500), which may access an address resolution server 28 to identify the location of the internet based edge control node 22" providing access to the carrier network 16 (step 502). Having the address of the internet based edge control node 22", the Invite can be forwarded to the internet based edge control node 22" (step 504). The internet based edge control node 22" may access the address resolution server 28 to identify the appropriate carrier based edge control node 22' (step 506).

The internet based edge control node 22" may also access an authentication server 38 to authenticate the source of the Invite (step 508). Authentication may use the Liberty Identity Federation Framework (ID-FF) the Security Association Markup Language (SAML), or any other appropriate means. After authentication, the internet based edge control node 22" may also access the policy server 30 to identify the appropriate carrier based edge control node 22' to which the invite should be routed (step 510). The Invite is then forwarded over the carrier network 16 to the carrier based edge control node 22' (step 512), which will access the policy server 30 to obtain the policy associated with the foreign domain xyz (step 514). Once the policy is obtained, filter criteria is applied based on the policy to determine whether the Invite should be forwarded, blocked, or otherwise processed. Assuming the Invite can be forwarded, the carrier based edge control node 22' will forward the Invite to user proxy 20' (step 516), which will forward the Invite to user alpha 12 to initiate the session signaling or the communication session (step 518). Again, the policy obtained from the policy server 30 by the carrier based edge control node 22' may be a policy associated with the foreign domain xyz of user alpha 12 and include approved or disapproved sources and associated services. The policy may also process the Invite based on whether user alpha 12 is approved or disapproved.

Figure 7A:
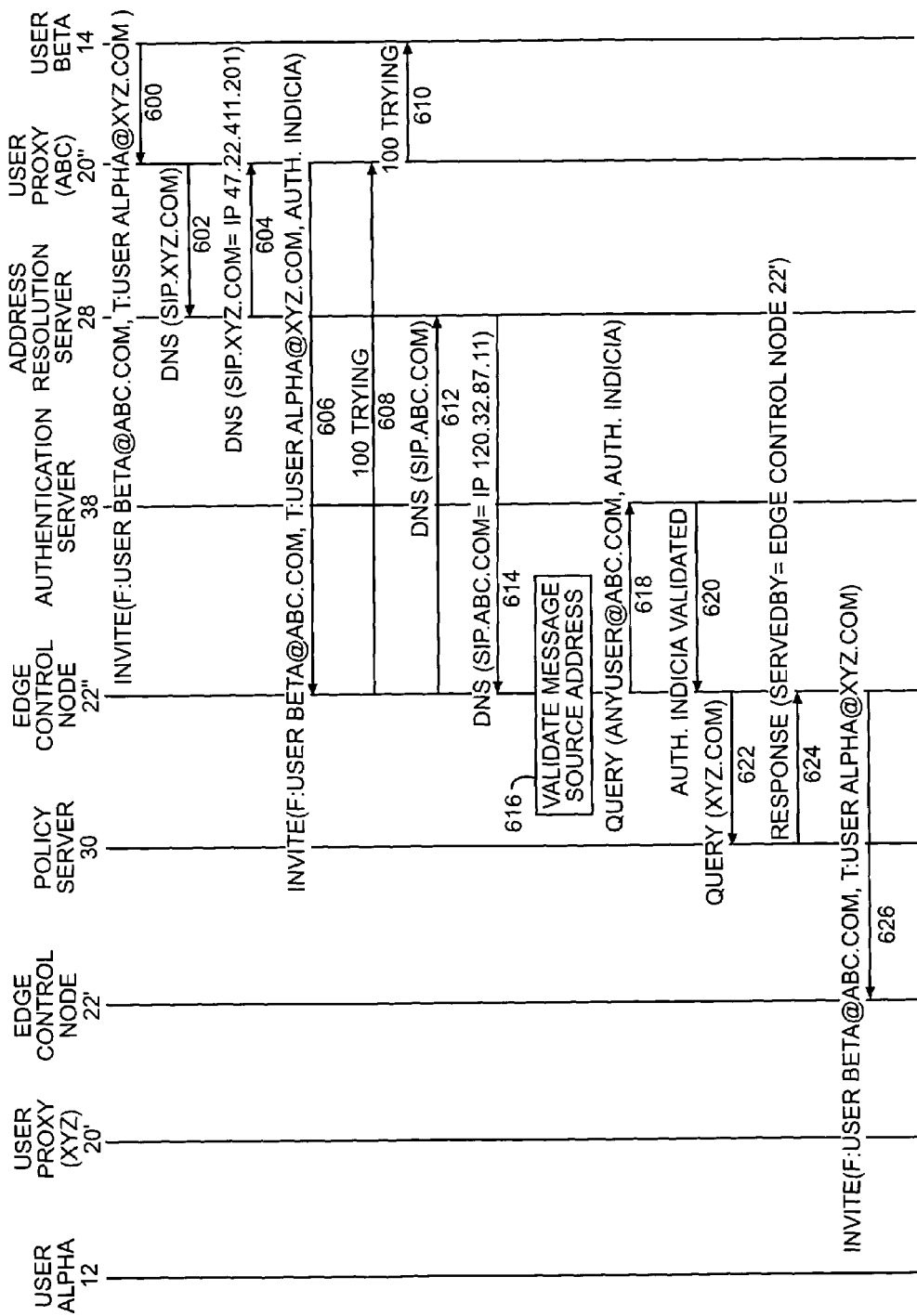
FIGS. 7A and 7B illustrate a communication flow for the example provided in FIG. 6.
Figure 7B:
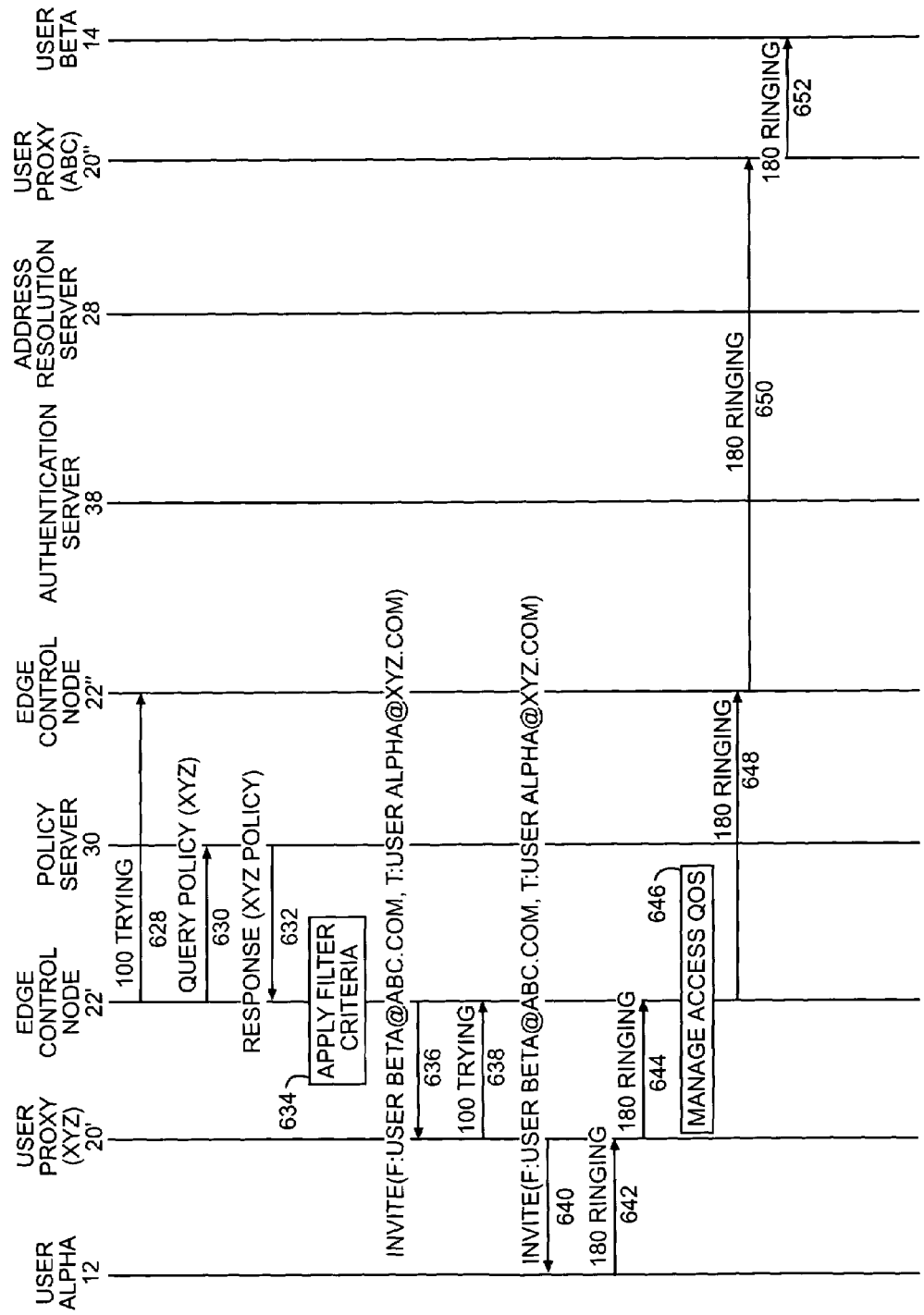

Turing now to FIGS. 7A and 7B, a more detailed communication flow is illustrated for the example of FIG. 6. Initially, user beta 14 will send an Invite to user proxy 20" (step 600), which will access the address resolution server 28 to obtain the IP address associated with edge control node 22", which is serving user proxy 20" (step 602). Upon receipt of the IP address for the internet based edge control node 22" (step 604), user proxy 20" will forward the Invite to the internet based edge control node 22" (step 606). The internet based edge control node 22" may respond with a 100 Trying message (step 608), which is forwarded by user proxy 20' to user beta 14 (step 610).

The internet based edge control node 22" may access the address resolution server 28 to obtain the IP address associated with user proxy 20", which supports the foreign domain abc (step 612). Upon receiving the IP address for user proxy 20" (step 614), the internet based edge control node 22" may use the IP address received from the address resolution server 28 to validate the source address of the Invite (step 616).

The original Invite and the Invite forwarded to the internet based edge control node 22" may include authentication indicia provided by user beta 14. The internet based edge control node 22" may then send a query to the authentication server 38 identifying the foreign domain abc of user beta 14 and providing the authentication indicia originally provided by user beta 14 (step 618). The authentication server 38 will interact with the edge control node 22" to validate authentication indicia provided for user beta 14. Assuming the information to be authenticated is validated, the internet based edge control node 22" will receive the validation from the authentication server 38 (step 620) prior to further processing.

The internet based edge control node 22" may then access the policy server 30 to identify the carrier based edge control node 22' supporting the destination domain, foreign domain xyz, of user alpha 12 (step 622). Upon receiving information identifying the carrier based edge control node 22' (step 624), the internet based edge control node 22" will forward the Invite to the carrier based edge control node 22' (step 626), which will respond with a 100 Trying message (step 628).

The carrier based edge control node 22' may then query the policy server 30 for the policy associated with the foreign domain xyz of user alpha 12 (step 630). The policy server 30 will respond by sending the policy for the foreign domain xyz to the carrier based edge control node 22' (step 632). The carrier based edge control node 22' will then apply a filter criteria to the Invite based on the retrieved policy (step 634) and process the Invite accordingly.

Assuming the Invite should be forwarded towards its destination, the carrier based edge control node 22' will forward the Invite to user proxy 20' (step 636), which will respond with a 100 trying message (step 638) and forward the Invite toward user alpha 12 (step 640). User alpha 12 may respond with a 180 Ringing message, which may include the SDP information for user alpha 12 (step 642). Again, the Invite may include the SDP information for user beta 14. User proxy 20' will forward the 180 Ringing message to the carrier based edge control node 22' (step 644), which may take the necessary steps to manage the quality of service level for access network 18' (step 646), as well as forward the 180 Ringing message to the internet based edge control node 22" (step 648). The internet based edge control node 22" will forward the 180 Ringing message to user proxy 20" (step 650), which will forward the 180 Ringing message to user beta 14 (step 652). The session signaling will continue between user beta 14 and user alpha 12 through the various signaling nodes in traditional fashion until the session is established and communications can take place between user beta 14 and user alpha 12 in the desired fashion.

Those skilled in the art will recognize that the examples and communication flows are provided for illustrative purposes and are not intended to limit the invention in any way.

The types of session control messages need not be SIP based or be limited to SIP Invites, 100 Trying messages, or 180 Ringing messages. These messages are only provided to illustrate a real world example, wherein SIP is used to facilitate virtually any type of multimedia communication session for data, audio, video, voice, and messaging applications.

Figure 8:
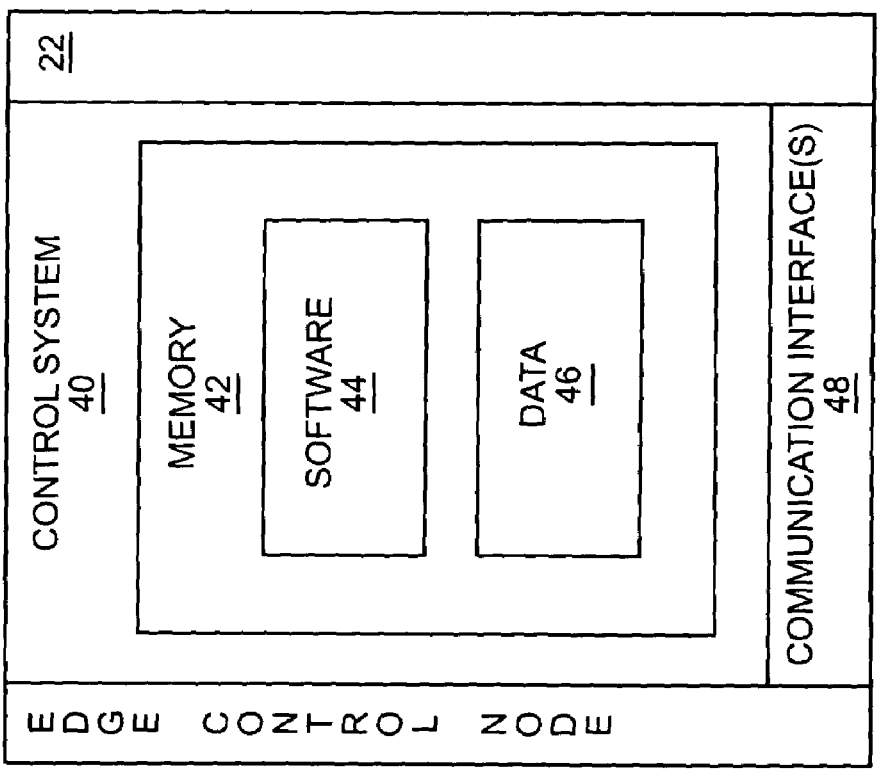
FIG. 8 is a block representation of a control node according to one embodiment of the present invention.

With reference to FIG. 8, an exemplary edge control node 22 is illustrated. The edge control node 22 will include a control system 40 having sufficient memory 42 for the requisite software 44 and data 46 to operate as described above. Software 44 may be configured to enable the edge control node 22 to act as a carrier based or internet based control node. The control system 40 may also be associated with one or more communication interfaces 48 to facilitate communications over various carrier, access, or internet based networks described above.

Figure 9:
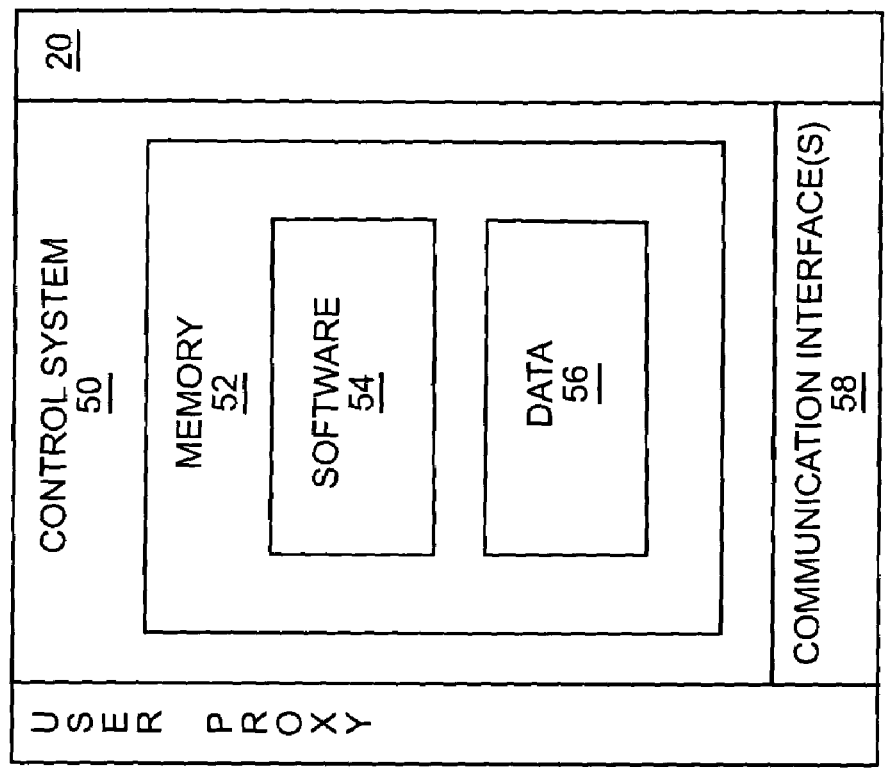
FIG. 9 is a block representation of a user proxy according to one embodiment of the present invention.

With reference to FIG. 9, the user proxy 20 is illustrated according to one embodiment of the present invention. The user proxy 20 may include a control system 50 having sufficient memory 52 with the requisite software 54 and data 56 to operate as described above. The control system 50 will generally be associated with one or more communication interfaces 58 to facilitate communications over the various access networks and with the supported user endpoints.

Those skilled in the art will recognize improvements and modifications to the preferred embodiments of the present invention. All such improvements and modifications are considered within the scope of the concepts disclosed herein and the claims that follow.

What is claimed is:

1. A method for processing a signaling message associated with a first foreign domain and intended to establish a communication session involving a first entity associated with the first foreign domain, comprising:
   receiving the signaling message in a transit domain through which the signaling message must travel to establish the communication session;
   accessing a first policy for the first foreign domain; and
   in the transit domain, applying the first policy for the first foreign domain to the signaling message to control establishment of the communication session, wherein the first entity is not associated with the transit domain.

2. The method of claim 1 further comprising:
   establishing an association between the transit domain and the first foreign domain; and
   providing the first policy based on the transit domain's association with the first foreign domain.

3. The method of claim 2 wherein a plurality of entities, including the first entity, are associated with the first foreign domain and not the transit domain.

4. The method of claim 3 wherein the first policy for the first foreign domain is applied in the transit domain to at least one of inbound signaling messages intended for or outbound signaling messages from any of the plurality of entities associated with the first foreign domain.

5. The method of claim 1 further comprising:
   providing a second policy for unassociated foreign domains, which do not have an established association with the transit domain; and
   in the transit domain, applying the second policy for the unassociated foreign domains to certain signaling messages associated with the unassociated foreign domains.

6. The method of claim 1 further comprising:
   establishing an association between the transit domain and a second foreign domain;
   providing a second policy based on the transit domain's association with the second foreign domain, the first policy different from the second policy; and
   in the transit domain, applying the second policy for the second foreign domain to certain signaling messages associated with the second foreign domain.

7. The method of claim 6 wherein the transit domain comprises first and second transit domains, the first transit domain associated with the first foreign domain and the second transit domain associated with the second foreign domain.

8. The method of claim 1 wherein the signaling message is intended for the first entity and includes an address associated with the first entity.

9. The method of claim 1 wherein the signaling message originates from the first entity and includes an address associated with the first entity.

10. The method of claim 1 wherein the first policy associated with the first foreign domain is applied for all entities associated with the first foreign domain.

11. The method of claim 1 wherein the first policy associated with the first foreign domain further defines specific policies for specific entities associated with the first foreign domain.

12. The method of claim 1 wherein the first policy associated with the first foreign domain provides at least one criterion based on whether the signaling message is an inbound or outbound signaling message.

13. The method of claim 1 wherein the first policy associated with the first foreign domain provides at least one criterion based on an intended destination of the signaling message.

14. The method of claim 1 wherein the first policy associated with the first foreign domain provides at least one criterion based on a source of the signaling message.

15. The method of claim 1 wherein the first policy associated with the first foreign domain provides at least one criterion based on a type of media that the communication session will carry.

16. The method of claim 1 wherein the first policy associated with the first foreign domain provides criterion based on a domain in which a second entity to the communication session is located.

17. The method of claim 1 wherein the first policy associated with the first foreign domain provides criterion based on prior communications sessions involving the first entity.

18. The method of claim 1 wherein the first policy associated with the first foreign domain requires that the signaling message be blocked to avoid establishment of the communication session.

19. The method of claim 1 wherein the first policy associated with the first foreign domain requires that the signaling message be rerouted to a destination other than an originally intended destination.

20. The method of claim 1 wherein the first foreign domain comprises a proxy and the first entity, which is supported by the proxy.

21. The method of claim 1 wherein the transit domain comprises an Internet Protocol Multimedia Subsystem and the first entity, which is supported by the Internet Protocol Multimedia Subsystem.

22. The method of claim 1 wherein the first foreign domain comprises the Internet.

23. The method of claim 1 further comprising authenticating at least one of the group consisting of the source and the source domain of the signaling message.

24. The method of claim 1 further comprising providing protocol adaptation between the first foreign domain and the transit domain.

25. An edge control node associated with a transit domain and adapted to process a signaling message associated with a first foreign domain and intended to establish a communication session involving a first entity associated with the first foreign domain comprising:
- at least one communication interface; and
- a control system associated with the at least one communication interface and adapted to:
   - receive the signaling message in the transit domain through which the signaling message must travel to establish the communication session;
   - access a first policy for the first foreign domain; and
   - in the transit domain, apply the first policy for the first foreign domain to the signaling message to control establishment of the communication session, wherein the first entity is not associated with the transit domain.

26. The edge control node of claim 25 wherein the control system is further adapted to:
- establish an association between the transit domain and the first foreign domain; and
- provide the first policy based on the transit domain's association with the first foreign domain.

27. The edge control node of claim 25 wherein a plurality of entities, including the first entity, are associated with the first foreign domain and not the transit domain.

* * * * *

UNITED STATES PATENT AND TRADEMARK OFFICE
CERTIFICATE OF CORRECTION

| | | |
|---|---|---|
| PATENT NO. | : 7,639,698 B1 | Page 1 of 1 |
| APPLICATION NO. | : 11/365024 | |
| DATED | : December 29, 2009 | |
| INVENTOR(S) | : Sylvain et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Twenty-first Day of December, 2010

David J. Kappos
*Director of the United States Patent and Trademark Office*